(12) United States Patent
Adams et al.

(10) Patent No.: US 10,938,888 B2
(45) Date of Patent: Mar. 2, 2021

(54) METHODS FOR PROVIDING CONTROL AND MANAGEMENT OF SERVICES IN A HYBRID CLOUD ENVIRONMENT AND DEVICES THEREOF

(71) Applicant: JPMorgan Chase Bank, N.A., New York, NY (US)

(72) Inventors: Duncan Adams, Keysoe (GB); Alex Hayzelden, Chigwell (GB); Kevin W. Hopkins, Saint Albans, NY (US); Tanmay Madan, London (GB); Trevor Collins, Woking (GB); Grama K. Harish, New York, NY (US); Stephen Flaherty, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/418,225

(22) Filed: May 21, 2019

(65) Prior Publication Data
US 2019/0356724 A1    Nov. 21, 2019

Related U.S. Application Data

(60) Provisional application No. 62/674,175, filed on May 21, 2018.

(51) Int. Cl.
*H04L 29/08* (2006.01)
*H04L 12/24* (2006.01)
*H04L 29/06* (2006.01)

(52) U.S. Cl.
CPC .............. *H04L 67/10* (2013.01); *H04L 41/22* (2013.01); *H04L 67/18* (2013.01); *H04L 67/32* (2013.01); *H04L 67/36* (2013.01); *H04L 67/42* (2013.01)

(58) Field of Classification Search
CPC ......... H04L 67/10; H04L 41/22; H04L 67/18; H04L 67/32; H04L 67/42; H04L 67/36; G06Q 30/0206
USPC ....................................................... 709/223
See application file for complete search history.

(56) References Cited

U.S. PATENT DOCUMENTS

| 2012/0130781 | A1  | 5/2012 | Li |
| 2012/0239739 | A1* | 9/2012 | Manglik ............... G06F 9/5077 709/203 |
| 2014/0081684 | A1  | 3/2014 | Hadar |
| 2014/0278808 | A1* | 9/2014 | Iyoob ................ G06Q 30/0206 705/7.35 |

OTHER PUBLICATIONS

International Search Report in corresponding International Application No. PCT/US19/33358, dated Aug. 26, 2019.

* cited by examiner

*Primary Examiner* — Glenford J Madamba
(74) *Attorney, Agent, or Firm* — Greenblum & Bernstein, P.L.C.

(57) ABSTRACT

Systems and methods for managing applications in a hybrid cloud environment are provided. The methods include obtaining first parameter values based on information that relates to a first cloud service provider; obtaining second parameter values based on information that relates to a second cloud service provider; and using the first parameter values and the second parameter values to determine whether to recommend a redeployment of the first application from the first cloud service provider to the second cloud service provider.

18 Claims, 6 Drawing Sheets

METHODS FOR PROVIDING CONTROL AND MANAGEMENT OF SERVICES IN A HYBRID CLOUD ENVIRONMENT AND DEVICES THEREOF

CROSS-REFERENCE TO RELATED APPLICATIONS

This application claims the benefit of U.S. Provisional Patent Application Ser. No. 62/674,175, filed May 21, 2018, which is hereby incorporated by reference in its entirety.

BACKGROUND

1. Field of the Disclosure

This technology generally relates to methods and systems for managing services in a hybrid cloud environment.

2. Background Information

With the proliferation of numerous cloud vendors, many organizations have begun adopting a hybrid cloud strategy. In a hybrid cloud environment, multiple cloud service providers are employed, rather than using a single cloud service provider. Such a strategy yields flexibility with respect to access and utilization of the cloud service providers.

In the hybrid cloud environment, each individual cloud service provider uses its own respective management and control interface. As a result, a full utilization of the available services that are offered by all of the cloud service providers requires logging into and utilizing all of the corresponding management and control interfaces. This requirement may be logistically challenging and time consuming.

Therefore, in view of the above, there is an unmet need for a capability to control and manage applications being serviced in a hybrid cloud environment in an efficient and uniform manner.

SUMMARY

The present disclosure, through one or more of its various aspects, embodiments, and/or specific features or sub-components, provides, inter alia, various systems, servers, devices, methods, media, programs, and platforms for managing services in a hybrid cloud environment. The various aspects, embodiments, features, and/or sub-components provide optimized processes of managing services in a hybrid cloud environment.

According to an aspect of the present disclosure, a method for managing services in a hybrid cloud environment is provided. The method is implemented by a processor on a computing device. The method includes: receiving, for a first application that is associated with a first cloud service provider from among a plurality of cloud service providers, a request for a first value of at least one service parameter from among a plurality of service parameters; obtaining the first value of each of the at least one service parameter based on information that relates to the first cloud service provider; displaying, on a display of the computing device, a user interface that includes information that relates to the obtained first value and the first cloud service provider; obtaining a second value of each of the at least one service parameter based on information that relates to a second cloud service provider; displaying, on the display of the computing device and within the user interface, information that relates to the obtained second value and the second cloud service provider; using the obtained first value and the obtained second value to determine whether to recommend a redeployment of the first application from the first cloud service provider to the second cloud service provider; and displaying, on the display of the computing device and within the user interface, information that relates to a result of the determination.

The plurality of service parameters may include a cost parameter that relates to a cost for servicing an application that is associated with a cloud service provider, a security parameter that relates to a security level for the application that is associated with the cloud service provider, a resource availability parameter that relates to an amount of available resources for the application that is associated with the cloud service provider, a performance parameter that relates to a latency associated with a processing of the application by the cloud service provider, and a geographical location parameter that relates to a geographical location of the cloud service provider.

The at least one service parameter may include a first parameter and a second parameter. The method may further include using the obtained first value and the obtained second value of the first parameter and using the obtained first value and the obtained second value of the second parameter to determine whether to recommend the redeployment of the first application.

The method may further include: assigning a first weight to each of the obtained first value and the obtained second value of the first parameter; assigning a second weight to each of the obtained first value and the obtained second value of the second parameter; and using the weighted first value and the weighted second value of the first parameter and using the weighted first value and the weighted second value of the second parameter to determine whether to recommend the redeployment of the first application.

The first application may include one from among an audio streaming application, a video streaming application, and a data storage application.

The method may further include: obtaining a third value of each of the at least one service parameter based on information that relates to a third cloud service provider; displaying, on the display of the computing device and within the user interface, information that relates to the obtained third value and the third cloud service provider; and using the obtained first value, the obtained second value, and the obtained third value to determine whether to recommend a redeployment of the first application from the first cloud service provider to at least one of the second cloud service provider and the third cloud service provider.

The information that relates to the result of the determination may include a recommendation to redeploy the first application to the second cloud service provider.

The information that relates to the result of the determination may further include an average monthly cost for servicing the first application that is associated with the second cloud service provider.

The information that relates to the result of the determination may further include at least one justification for the recommendation that is based on at least one of the plurality of service parameters.

The displaying the information that relates to the obtained second value and the second cloud service provider may include displaying a graphical depiction of the information that relates to the obtained second value.

According to another aspect of the present disclosure, a computing device configured to implement an execution of a method for managing services in a hybrid cloud environment is provided. The computing device includes a display screen, a processor, a memory, and a communication interface coupled to each of the processor, the memory, and the display screen. The processor is configured to: receive, for a first application that is associated with a first cloud service provider from among a plurality of cloud service providers, a request for a first value of at least one service parameter from among a plurality of service parameters; obtain the first value of each of the at least one service parameter based on information that relates to the first cloud service provider; display, on the display screen, a user interface that includes information that relates to the obtained first value and the first cloud service provider; obtain a second value of each of the at least one service parameter based on information that relates to a second cloud service provider; display, on the display screen and within the user interface, information that relates to the obtained second value and the second cloud service provider; use the obtained first value and the obtained second value to determine whether to recommend a redeployment of the first application from the first cloud service provider to the second cloud service provider; and display, on the display screen and within the user interface, information that relates to a result of the determination.

The plurality of service parameters may include a cost parameter that relates to a cost for servicing an application that is associated with a cloud service provider, a security parameter that relates to a security level for the application that is associated with the cloud service provider, a resource availability parameter that relates to an amount of available resources for the application that is associated with the cloud service provider, a performance parameter that relates to a latency associated with a processing of the application by the cloud service provider, and a geographical location parameter that relates to a geographical location of the cloud service provider.

The at least one service parameter may include a first parameter and a second parameter. The processor may be further configured to use the obtained first value and the obtained second value of the first parameter and use the obtained first value and the obtained second value of the second parameter to determine whether to recommend the redeployment of the first application.

The processor may be further configured to: assign a first weight to each of the obtained first value and the obtained second value of the first parameter; assign a second weight to each of the obtained first value and the obtained second value of the second parameter; and use the weighted first value and the weighted second value of the first parameter and use the weighted first value and the weighted second value of the second parameter to determine whether to recommend the redeployment of the first application.

The first application may include one from among an audio streaming application, a video streaming application, and a data storage application.

The processor may be further configured to: obtain a third value of each of the at least one parameter based on information that relates to a third cloud service provider; display, on the display screen and within the user interface, information that relates to the obtained third value and the third cloud service provider; and use the obtained first value, the obtained second value, and the obtained third value to determine whether to recommend a redeployment of the first application from the first cloud service provider to at least one of the second cloud service provider and the third cloud service provider.

The information that relates to the result of the determination may include a recommendation to redeploy the first application to the second cloud service provider.

The information that relates to the result of the determination may further include an average monthly cost for servicing the first application that is associated with the second cloud service provider.

The information that relates to the result of the determination may further include at least one justification for the recommendation that is based on at least one of the plurality of service parameters.

The processor may be further configured to display, on the display screen and within the user interface, a graphical depiction of the information that relates to the obtained second value.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
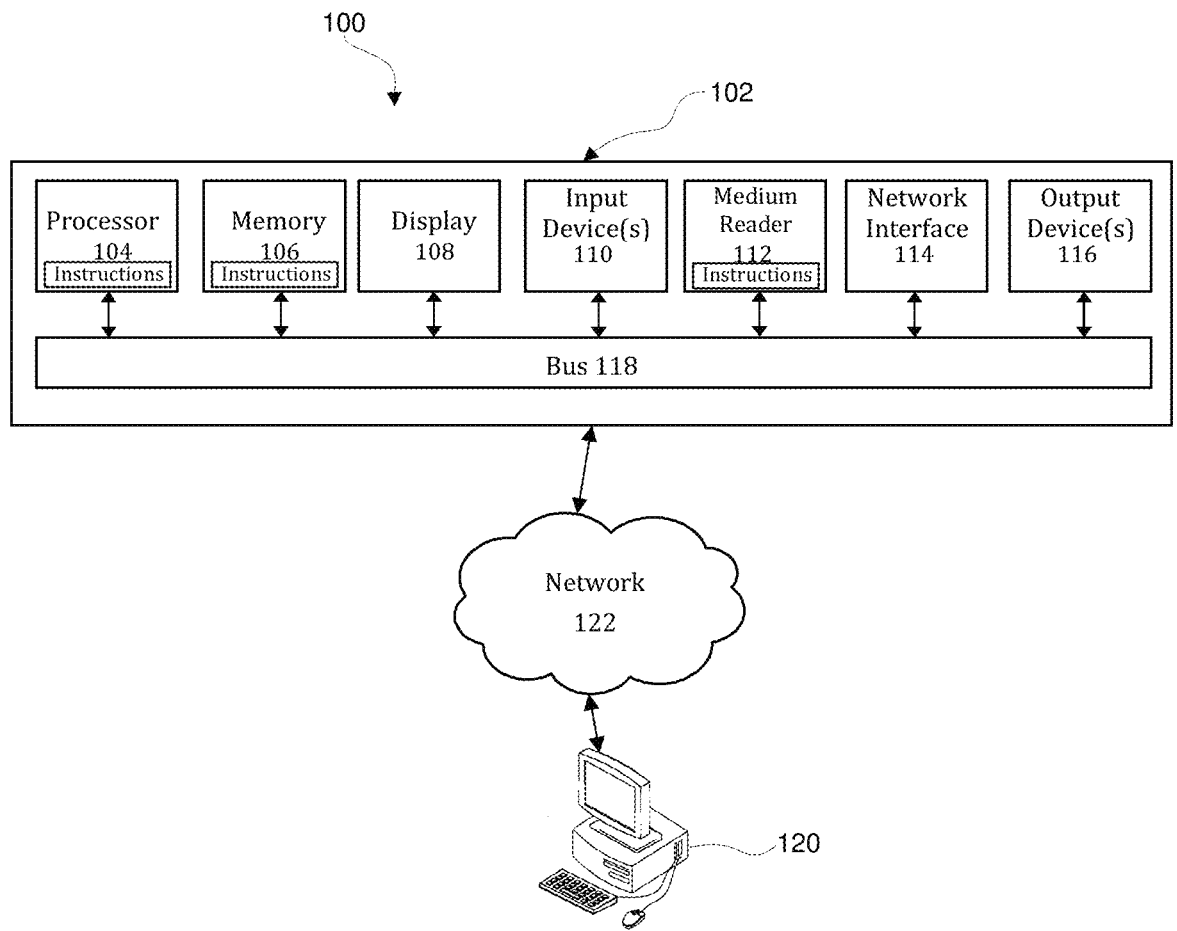
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a client-server user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of managing services in a hybrid cloud environment.

Figure 2:
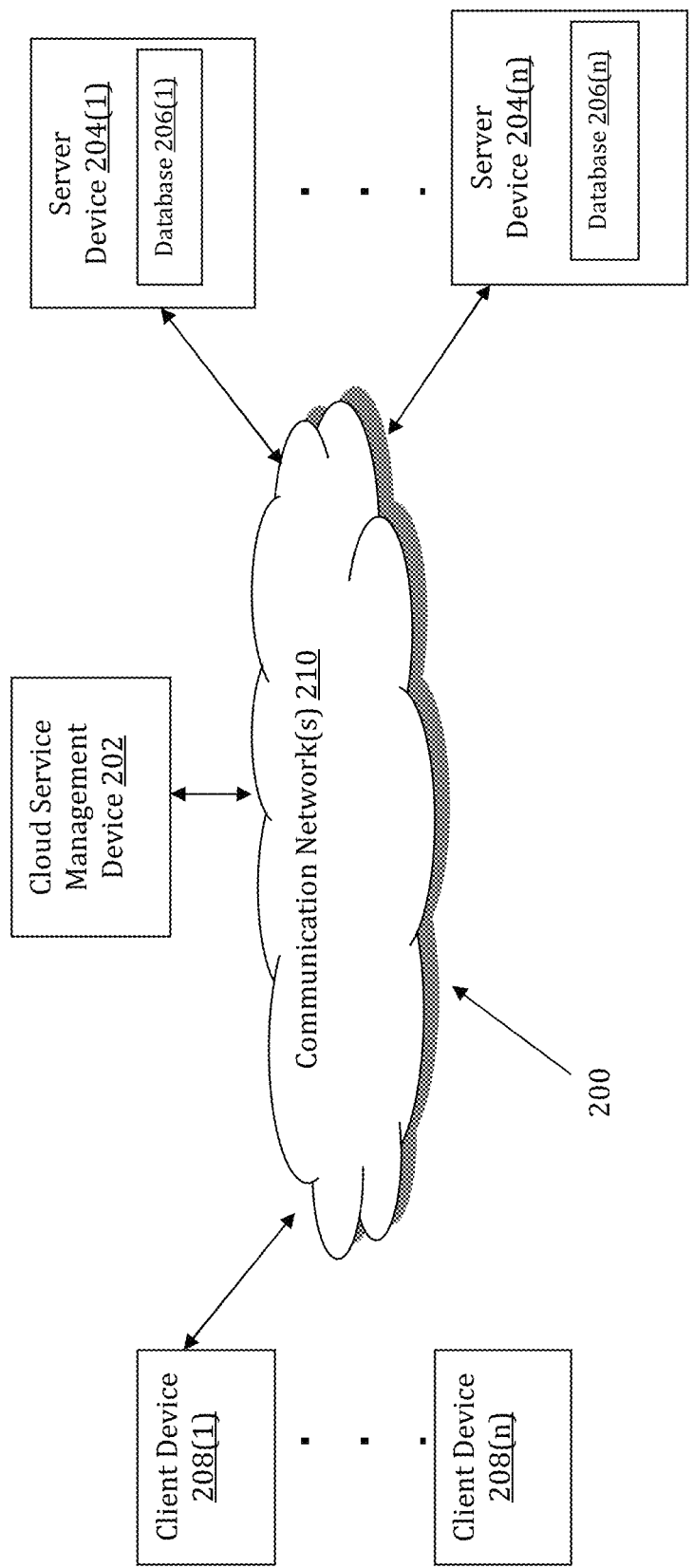
FIG. 2 illustrates an exemplary diagram of a network environment.

Referring to FIG. 2, a schematic of an exemplary network environment 200 for implementing a method for managing services in a hybrid cloud environment is illustrated. In an exemplary embodiment, the method is executable on any networked computer platform, such as, for example, a wireless mobile communication device, i.e., a smart phone.

The method for managing services in a hybrid cloud environment may be implemented by a Cloud Service Management (CSM) device 202. The CSM device 202 may be the same or similar to the computer system 102 as described with respect to FIG. 1. The CSM device 202 may store one or more applications that can include executable instructions that, when executed by the CSM device 202, cause the CSM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CSM device 202 itself, may be located in virtual server(s) running in a cloud-based computing environment rather than being tied to one or more specific physical network computing devices. Also, the application(s) may be running in one or more virtual machines (VMs) executing on the CSM device 202. Additionally, in one or more embodiments of this technology, virtual machine(s) running on the CSM device 202 may be managed or supervised by a hypervisor.

In the network environment 200 of FIG. 2, the CSM device 202 is coupled to a plurality of server devices 204(1)-204(n) that hosts a plurality of databases 206(1)-206(n), and also to a plurality of client devices 208(1)-208(n) via communication network(s) 210. A communication interface of the CSM device 202, such as the network interface 114 of the computer system 102 of FIG. 1, operatively couples and communicates between the CSM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CSM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CSM devices that efficiently manage large numbers of services in a hybrid cloud environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CSM device 202 may be a standalone device or integrated with one or more other devices or apparatuses, such as one or more of the server devices 204(1)-204(n), for example. In one particular example, the CSM device 202 may include or be hosted by one of the server devices 204(1)-204(n), and other arrangements are also possible. Moreover, one or more of the devices of the CSM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CSM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store cloud service provider data, application analytics data, and any other data that relates to cloud service management and administration.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a primary/secondary approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), and/or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CSM device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CSM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CSM device 202, the server devices 204(1)-204(n), or the client devices 208(1)-208(n), for example, may be configured to operate as virtual instances on the same physical machine. In other words, one or more of the CSM device 202, the server devices 204(1)-204(n), or the client devices 208(1)-208(n) may operate on the same physical device rather than as separate devices communicating through communication network(s) 210. Additionally, there may be more or fewer CSM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
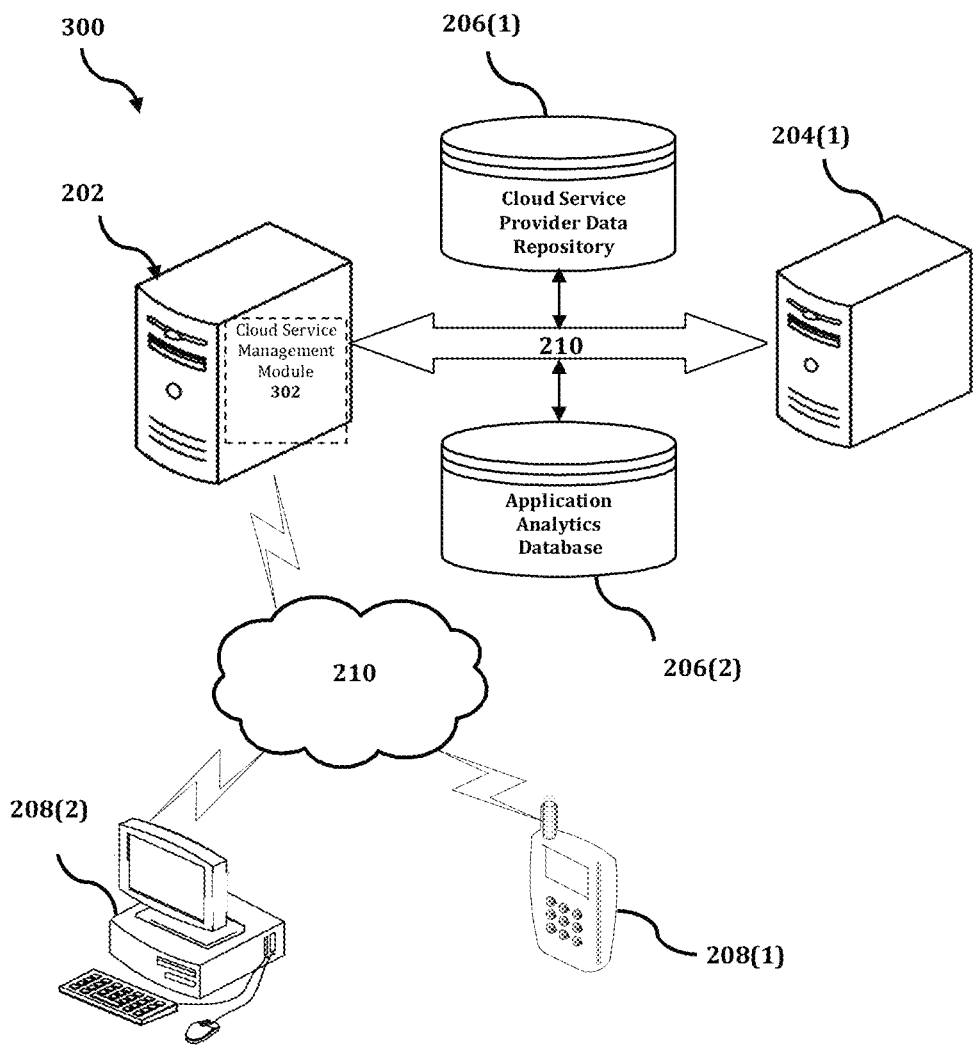
FIG. 3 shows an exemplary system for managing services in a hybrid cloud environment.

The CSM device 202 is described and shown in FIG. 3 as including a cloud service management module 302, although it may include other modules, databases, or applications, for example. As will be described below, the cloud service management module 302 is configured to process large numbers of cloud service management requests in order to manage services and applications in a hybrid cloud environment in an automated, efficient, scalable, and reliable manner.

An exemplary process 300 for managing services in a hybrid cloud environment by utilizing the network environment of FIG. 2 is shown as being executed in FIG. 3. Specifically, a first client device 208(1) and a second client device 208(2) are illustrated as being in communication with CSM device 202. In this regard, the first client device 208(1) and the second client device 208(2) may be "clients" of the CSM device 202 and are described herein as such. Nevertheless, it is to be known and understood that the first client device 208(1) and/or the second client device 208(2) need not necessarily be "clients" of the CSM device 202, or any entity described in association therewith herein. Any additional or alternative relationship may exist between either or both of the first client device 208(1) and the second client device 208(2) and the CSM device 202, or no relationship may exist.

Further, CSM device 202 is illustrated as being able to access a cloud service provider data repository 206(1) and an application analytics database 206(2). The cloud service management module 302 may be configured to access these databases for implementing a process for managing services in a hybrid cloud environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CSM device 202 via broadband or cellular communication. Of course, these embodiments are merely exemplary and are not limiting or exhaustive.

Upon being started, the cloud service management module 302 executes a process for managing services in a hybrid cloud environment. An exemplary process for managing services in a hybrid cloud environment is generally indicated at flowchart 400 in FIG. 4.

Figure 4:
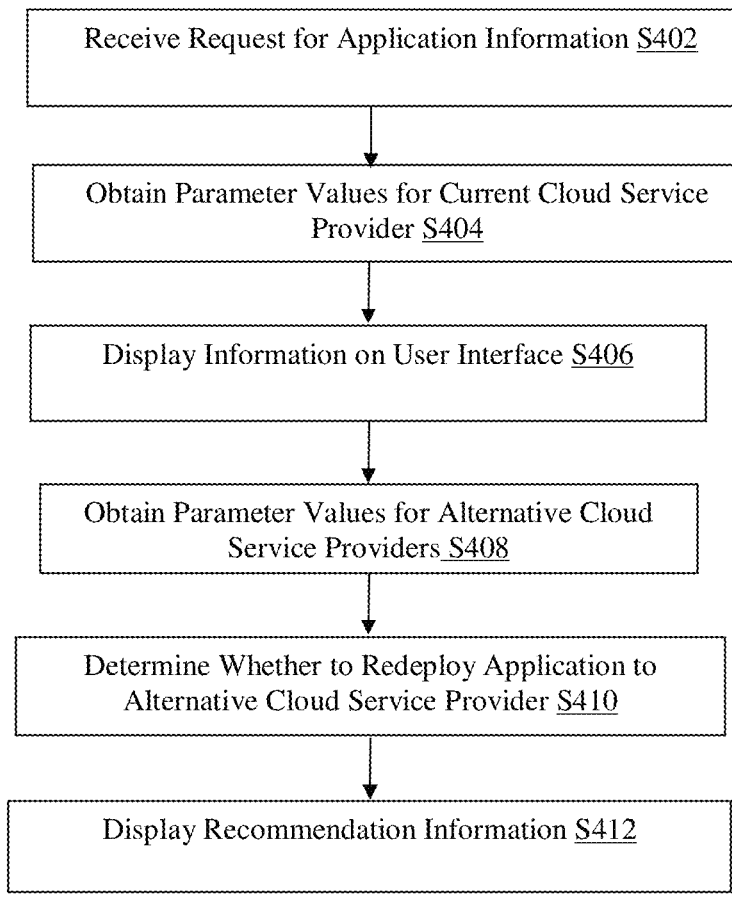
FIG. 4 is a flowchart of an exemplary method for managing services in a hybrid cloud environment.

In the process 400 of FIG. 4, at step S402, the cloud service management module 302 receives a request for information about an application that is serviced by a current cloud service provider. In an exemplary embodiment, the application may include an audio streaming application, a video streaming application, or a data storage application. The requested information may include information about one or more service parameters that relate to the servicing of the application by the current cloud service provider.

At step S404, the cloud service management module 302 obtains service parameter values that correspond to the requested information. For example, the service parameters may include a cost parameter that indicates a cost for servicing an application by the cloud service provider, such as an average cost per month. Additionally, the cloud service management module 302 may set parameters on cost and utilization. For example, the cloud service management module 302 may override or manipulate the utilization based on pre-set values for parameters, such as cost.

The service parameters may include a security parameter that indicates a security level for the application with respect to the cloud service provider. For example, a particular cloud service provider may offer a service level agreement (SLA) that indicates a number of tiers of security for a particular application.

The service parameters may include a resource availability parameter that indicates an amount of resources that are available for servicing the application with respect to the cloud service provider. For example, a particular cloud service provider may indicate a number of available server devices, an amount of available memory, an amount of available bandwidth, a central processing unit (CPU) utilization metric, or any other quantifiable indicator of resource availability.

The service parameters may include a performance parameter that indicates latency associated with a processing of the application by the cloud service provider. For example, a particular service provider may indicate a high latency, which corresponds to a longer processing time or a delay that lengthens the overall time to completion, or a low latency, which corresponds to a relatively shorter processing time.

The service parameters may include a geographical location parameter that indicates a geographical location of the cloud service provider. For example, the cloud service provider may be located at one specific location, or at many locations within a particular region.

The service parameters may include any parameter known in the art that could affect the decision of a particular cloud service provider to be utilized for deployment of an application.

Figure 5:
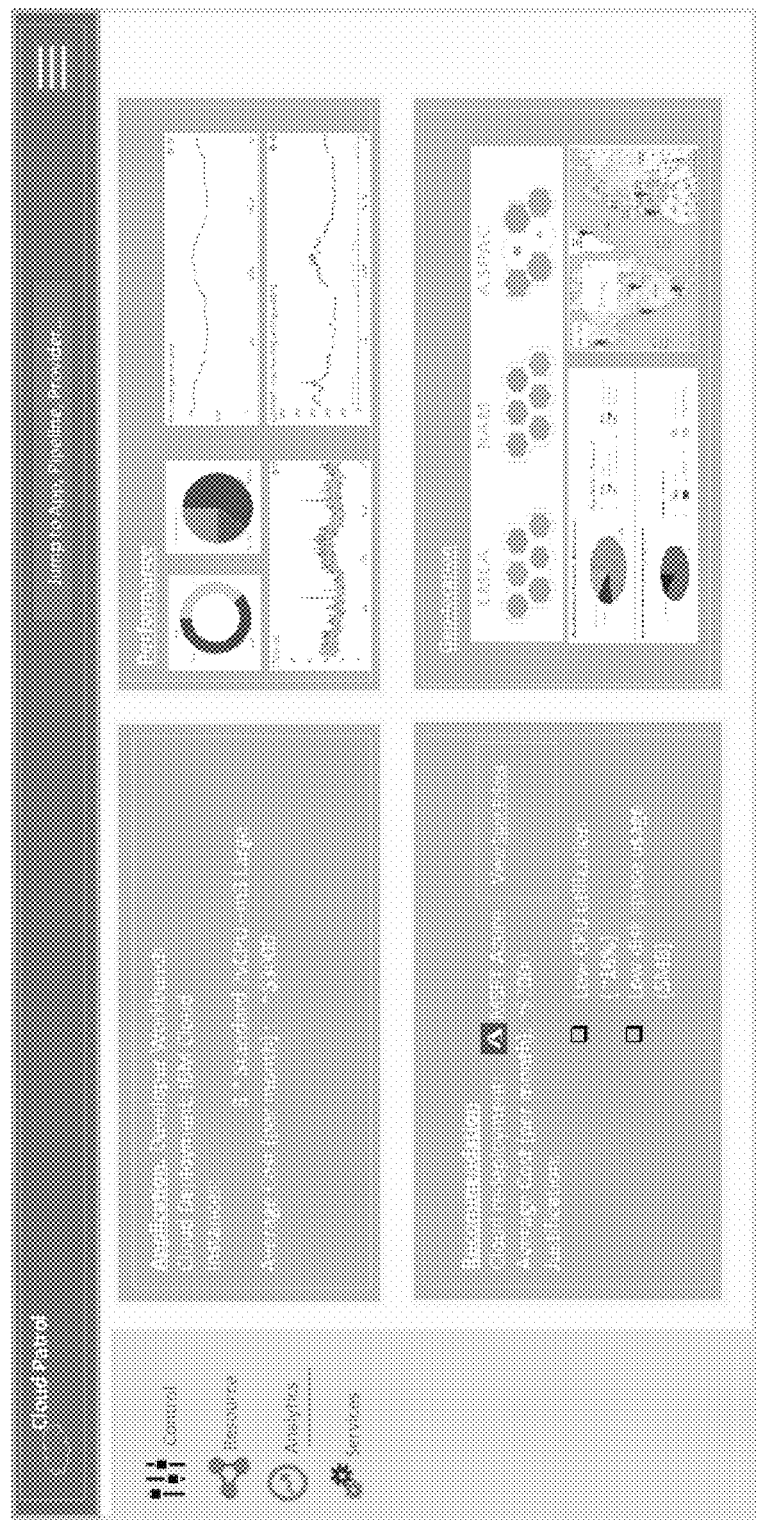
FIG. 5 illustrates a first screen shot that appears on a display of a system for managing services in a hybrid cloud environment, according to an exemplary embodiment.

At step S406, the cloud service management module 302 displays the obtained information on a user interface of the CSM device 202. Referring also to FIG. 5, a first screen shot of a display of a user interface for managing services in a hybrid cloud environment is illustrated. As shown in FIG. 5, an application name, a current cloud service provider (i.e., "IBM Cloud") and an average monthly cost of approximately $3000 are shown at the top left portion of the user interface. In addition, the top right portion of the user interface shows performance-related information, and the bottom right portion of the user interface shows geolocation information.

At step S408, the cloud service management module 302 obtains parameter values that correspond to the requested information for potential alternative cloud service providers. Such information may then be used to draw comparisons between the current cloud service provider and possible alternatives.

At step S410, the cloud service management module 302 uses the obtained parameter values to determine whether to recommend that the application be redeployed from the current cloud service provider to one of the alternative cloud service providers. In an exemplary embodiment, such a determination may be made based solely on one parameter, such as average monthly cost. In another exemplary embodiment, a respective weight may be assigned to each parameter, and then the weighted parameter values may be combined together to determine an overall score for each cloud service provider.

At step S412, a recommendation message is displayed on the user interface. In an exemplary embodiment, the recommendation message may include an identification of a recommended alternative cloud service provider, cost information that indicates a recurring cost associated with the recommended cloud service provider, and at least one justification that is based on a service parameter that has been evaluated and used for determining the recommendation. For example, referring again to FIG. 5, at the lower left portion of the user interface, there is a recommendation that the application be redeployed to a different cloud service provider (i.e., "Microsoft Azure"), an average monthly cost that is associated with the recommended cloud service provider (i.e., "42000"), and two justifications (i.e., "Low CPU utilization (~18%)" and "Low disk space usage (5 MB)"). In this aspect, the displaying of a recommendation message provides a user with valuable information for understanding the reasons for the recommendation.

Figure 6:
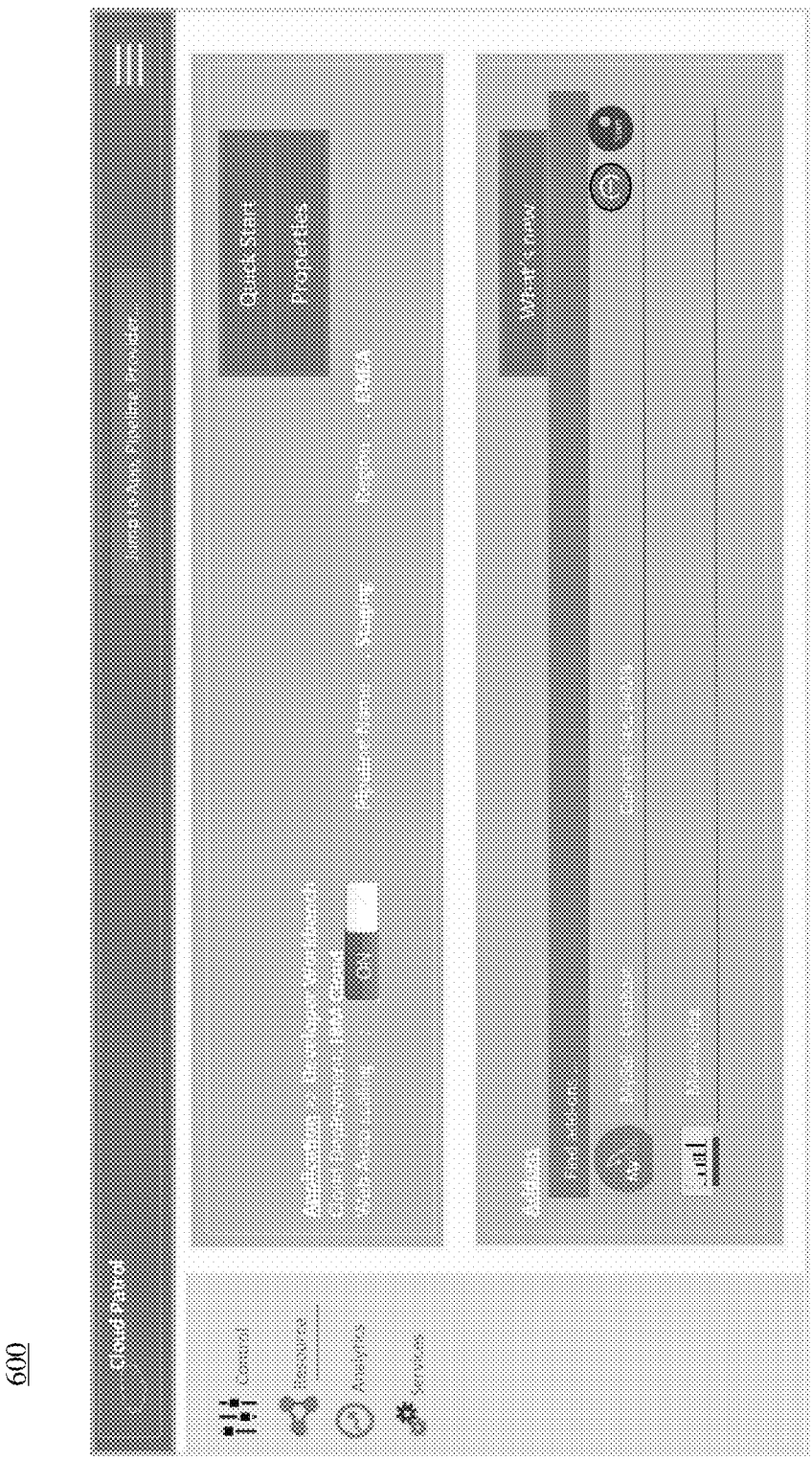
FIG. 6 illustrates a second screen shot that appears on a display of a system for managing services in a hybrid cloud environment, according to an exemplary embodiment.

Referring to FIG. 6, a second screen shot that appears on a display of a system for managing services in a hybrid cloud environment is illustrated, according to an exemplary embodiment. As shown in FIG. 6, information that relates to an application and a cloud service provider are displayed on a user interface, and the user interface includes several selectable items, such as buttons and clickable links, that provide a user with options for retrieving other types of information that are associated with the application, the current cloud service provider, and/or potential alternative cloud service providers.

Accordingly, with this technology, an optimized process for managing services in a hybrid cloud environment is provided. The optimized process enables a user to efficiently and automatically manage services and applications with respect to multiple cloud service providers via a single unified user interface.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing services in a hybrid cloud environment, the method being implemented by a processor on a computing device, the method comprising:
receiving, for a first application that is currently being serviced by a first cloud service provider from among a plurality of cloud service providers, a request for a first value of at least one service parameter from among a plurality of service parameters;
obtaining the first value of each of the at least one service parameter based on information that relates to the first cloud service provider;

obtaining a second value of each of the at least one service parameter based on information that relates to a second cloud service provider; and using the obtained first value and the obtained second value to determine whether to recommend a redeployment of the first application from the first cloud service provider to the second cloud service provider; and displaying, on a display screen of the computing device and within a user interface, information that relates to a result of the determination, the information including first identification information that identifies the first cloud service provider and second identification information that identifies the second cloud service provider.

2. The method of claim 1, wherein the plurality of service parameters includes a cost parameter that relates to a cost for servicing an application that is associated with a cloud service provider, a security parameter that relates to a security level for the application that is associated with the cloud service provider, a resource availability parameter that relates to an amount of available resources for the application that is associated with the cloud service provider, a performance parameter that relates to a latency associated with a processing of the application by the cloud service provider, and a geographical location parameter that relates to a geographical location of the cloud service provider.

3. The method of claim 1, wherein the at least one service parameter includes a first parameter and a second parameter, and wherein the method further comprises using the obtained first value and the obtained second value of the first parameter and using the obtained first value and the obtained second value of the second parameter to determine whether to recommend the redeployment of the first application.

4. The method of claim 3, further comprising:
assigning a first weight to each of the obtained first value and the obtained second value of the first parameter;
assigning a second weight to each of the obtained first value and the obtained second value of the second parameter; and
using the weighted first value and the weighted second value of the first parameter and using the weighted first value and the weighted second value of the second parameter to determine whether to recommend the redeployment of the first application.

5. The method of claim 1, further comprising:
obtaining a third value of each of the at least one service parameter based on information that relates to a third cloud service provider; and
using the obtained first value, the obtained second value, and the obtained third value to determine whether to recommend a redeployment of the first application from the first cloud service provider to at least one of the second cloud service provider and the third cloud service provider.

6. The method of claim 5, wherein the information that relates to the result of the determination includes a recommendation to redeploy the first application to the second cloud service provider.

7. The method of claim 6, wherein the information that relates to the result of the determination further includes an average monthly cost for servicing the first application that is associated with the second cloud service provider.

8. The method of claim 7, wherein the information that relates to the result of the determination further includes at least one justification for the recommendation that is based on at least one of the plurality of service parameters.

9. The method of claim 5, wherein the displaying the information that relates to the obtained second value and the second cloud service provider includes displaying a graphical depiction of the information that relates to the obtained second value.

10. A system for managing services in a hybrid cloud environment, the system comprising:
a processor;
a memory;
a display screen; and
a communication interface coupled to each of the processor, the memory, and the display screen,
wherein the processor is configured to:
receive, for a first application that is currently being serviced by a first cloud service provider from among a plurality of cloud service providers, a request for a first value of at least one service parameter from among a plurality of service parameters;
obtain the first value of each of the at least one service parameter based on information that relates to the first cloud service provider;
obtain a second value of each of the at least one service parameter based on information that relates to a second cloud service provider;
use the obtained first value and the obtained second value to determine whether to recommend a redeployment of the first application from the first cloud service provider to the second cloud service provider; and
display, on the display screen and within a user interface, information that relates to a result of the determination, the information including first identification information that identifies the first cloud service provider and second identification information that identifies the second cloud service provider.

11. The system of claim 10, wherein the plurality of service parameters includes a cost parameter that relates to a cost for servicing an application that is associated with a cloud service provider, a security parameter that relates to a security level for the application that is associated with the cloud service provider, a resource availability parameter that relates to an amount of available resources for the application that is associated with the cloud service provider, a performance parameter that relates to a latency associated with a processing of the application by the cloud service provider, and a geographical location parameter that relates to a geographical location of the cloud service provider.

12. The system of claim 10, wherein the at least one service parameter includes a first parameter and a second parameter, and wherein the processor is further configured to use the obtained first value and the obtained second value of the first parameter and use the obtained first value and the obtained second value of the second parameter to determine whether to recommend the redeployment of the first application.

13. The system of claim 12, wherein the processor is further configured to:
assign a first weight to each of the obtained first value and the obtained second value of the first parameter;
assign a second weight to each of the obtained first value and the obtained second value of the second parameter; and
use the weighted first value and the weighted second value of the first parameter and use the weighted first value and the weighted second value of the second parameter to determine whether to recommend the redeployment of the first application.

14. The system of claim 10, wherein the processor is further configured to:
- obtain a third value of each of the at least one parameter based on information that relates to a third cloud service provider; and
- use the obtained first value, the obtained second value, and the obtained third value to determine whether to recommend a redeployment of the first application from the first cloud service provider to at least one of the second cloud service provider and the third cloud service provider.

15. The system of claim 10, wherein the information that relates to the result of the determination includes a recommendation to redeploy the first application to the second cloud service provider.

16. The system of claim 15, wherein the information that relates to the result of the determination further includes an average monthly cost for servicing the first application that is associated with the second cloud service provider.

17. The system of claim 16, wherein the information that relates to the result of the determination further includes at least one justification for the recommendation that is based on at least one of the plurality of service parameters.

18. The system of claim 10, wherein the processor is further configured to display, on the display screen and within the user interface, a graphical depiction of the information that relates to the obtained second value.

* * * * *